United States Patent
McElroy et al.

(10) Patent No.: US 11,297,104 B2
(45) Date of Patent: Apr. 5, 2022

(54) METHOD AND APPARATUS FOR RESILIENT DECOY ROUTING WITHOUT CONSPIRING AUTONOMOUS SYSTEMS (AS) VIA DISTRIBUTED HASH TABLE (DHT) ROUTING

(71) Applicant: AMBIT INC., Bellevue, WA (US)

(72) Inventors: Andrew Daniel McElroy, San Jose, CA (US); Kevin Patrick Kane, Bellevue, WA (US)

(73) Assignee: Ambit Inc., Bellevue, WA (US)

( * ) Notice: Subject to any disclaimer, the term of this patent is extended or adjusted under 35 U.S.C. 154(b) by 0 days.

(21) Appl. No.: 16/865,155

(22) Filed: May 1, 2020

(65) Prior Publication Data

US 2020/0351305 A1   Nov. 5, 2020

Related U.S. Application Data

(60) Provisional application No. 62/841,456, filed on May 1, 2019.

(51) Int. Cl.
*H04L 45/44* (2022.01)
*H04L 45/7453* (2022.01)
(Continued)

(52) U.S. Cl.
CPC ............ *H04L 63/164* (2013.01); *H04L 45/44* (2013.01); *H04L 45/7453* (2013.01); *H04L 63/1441* (2013.01); *H04L 67/1065* (2013.01)

(58) Field of Classification Search
None
See application file for complete search history.

(56) References Cited

U.S. PATENT DOCUMENTS

| | | | |
|---|---|---|---|
| 2005/0094640 A1* | 5/2005 | Howe | H04L 63/20 370/395.1 |
| 2012/0311691 A1* | 12/2012 | Karlin | H04L 63/0236 726/12 |

(Continued)

*Primary Examiner* — Kevin T Bates
*Assistant Examiner* — Emad Siddiqi
(74) *Attorney, Agent, or Firm* — ÆON Law; Adam L. K. Philipp; David V. H. Cohen

(57) ABSTRACT

A Method and apparatus for resilient Decoy Routing without conspiring Autonomous Systems by instead using a DHT routing table is described. In one embodiment of the present invention, there would exist a set of Decoy Routing Nodes which would be connected via a DHT's routing table. This would enable decoy routing nodes to not depend on a predefined list. Traditionally, Decoy Routing depends upon either a pre-configured list of computer systems to connect to or is wholly dependent upon BGP to happen to route to friendly Autonomous Systems that understand the true intent of the packet being routed. This method and apparatus solves these problems by providing a means to use a dynamic routing table, provided by a DHT to ensure that a packet can be delivered to computer systems that understand how to do decoy routing. This approach further ensures that the routing table being used is one that is kept up to date automatically as a function of the DHT providing the routing table. Further, the methodology described ensures that evading censorship, defending against TCP replay attacks, latency analysis, website fingerprinting, and denial of service (DoS) attacks are successfully executed.

15 Claims, 3 Drawing Sheets

(51) Int. Cl.
*H04L 67/1061* (2022.01)
*H04L 29/06* (2006.01)

(56) References Cited

U.S. PATENT DOCUMENTS

| | | | |
|---|---|---|---|
| 2013/0054832 A1* | 2/2013 | Umetsu | H04L 67/104 709/238 |
| 2016/0021224 A1* | 1/2016 | Howe | H04L 63/20 370/474 |

* cited by examiner

METHOD AND APPARATUS FOR RESILIENT DECOY ROUTING WITHOUT CONSPIRING AUTONOMOUS SYSTEMS (AS) VIA DISTRIBUTED HASH TABLE (DHT) ROUTING

CROSS-REFERENCE TO RELATED CASES

This application claims the benefit of provisional U.S. Patent Application No. 62/841,456, filed May 1, 2019, titled "METHOD AND APPARATUS FOR RESILIENT DECOY ROUTING WITHOUT CONSPIRING AUTONOMOUS SYSTEMS (AS) VIA DISTRIBUTED HASH TABLE (DHT) ROUTING," the entire disclosure of which is hereby incorporated by reference for all purposes.

FIELD OF THE INVENTION

This invention relates to computer networks and, more specifically, to enabling the creation of a computer network capable of evading censorship; defend against TCP replay attacks, latency analysis, website fingerprinting, and denial of service (DoS) attacks by way of a modified decoy routing scheme through the use of a distributed hash table.

BACKGROUND

Since time immemorial, human beings have always sought to protect their privacy from adversarial parties. Today, human beings have many sophisticated technological solutions to safeguard privacy. Such measures include Public-Key Encryption, Elliptic Curve Cryptography, the Distributed Hash Table (DHT), Decoy Routing, and many more solutions. Decoy Routing traditionally relies on a group of Autonomous Systems having the ability to look at an Internet Protocol (IP) Packet (version 4 or version 6) in a non-standard way (Conspiring Autonomous Systems) to route from one Autonomous System to another on the Internet. The aim of Decoy Routing is to allow for an adversarial actor (spy) to see only overt route information and not the actual intended route which is encoded covertly. Presently, Decoy Routing, at the end of the day, still relies upon known servers to connect to. Current Decoy Routing schemes rely on injecting additional routing information into a Transport Layer Security (TLS) Handshake. The injected payload into the TLS Handshake is done using a stenographic encryption methodology. Specifically, the ClientHello, ClientKeyExchange, and Finished components of a TLS 1.2/1.3 Handshake are modified to contain additional covert information. TLS 1.2/1.3 is defined by RFC5246 and RFC8446. Traditionally, Border Gateway Protocol (BGP) has been used to route between Autonomous Systems. BGP is defined by RFC 4271. The Internet is a Network of Networks. Autonomous Systems are how the Internet organizes these networks. In effect, the Internet is actually a Network of Autonomous Systems. Inside each Autonomous System exists one or more networks. An Internet Service Provider (ISP) for example is at the highest level one such example of an Autonomous System. However, Autonomous Systems are not necessarily Internet Service Providers. A large corporation or a university might be assigned an Autonomous System Number (ASN) by a Regional Internet Registry (RIR) under the authority of the Internet Assigned Numbers Authority (IANA).

Further, Distributed Hash Tables (DHTs) have enabled a revolution in distributed systems architecture. DHTs have made possible such applications as peer-to-peer (P2P) file sharing, P2P file storage, and P2P communications platforms. Distributed Hash Tables all generally comprise the following components: a Keyspace, a Keyspace Partitioning Scheme (KPS), and an Overlay Network. A Keyspace is also known as the Key Value Pair (KVP). The KVP is a scheme by which the data (the value) can be referenced quickly by the Key (which is a hash, using a standard Hashing Algorithm, of the aforementioned data being stored). The KPS describes how the Keyspace is organized across one or more computing systems. An Overlay Network is simply a network that is built on top of another network. One important property of a DHT is its ability to route between Nodes to access the entire Keyspace across many Nodes. A Node simply being a computer system which is participating in a DHT and providing space to host, in general, part of a DHT's Keyspace. While the KPS defines how the Keyspace is partitioned, a DHT must also have a routing scheme as part of the KPS.

BRIEF DESCRIPTION OF THE DRAWINGS

An exemplary embodiment of the present invention is described herein with reference to the drawings, in which.

SUMMARY OF INVENTION

In one embodiment of the present invention, there exists a set of Decoy Routing Nodes which would be connected via a DHT Routing Table which would enable Decoy Routing Nodes to not depend on a manually created list.

Embodiments may provide a mechanism for the Decoy Routing to ensure that the connection list is always up to date by way of a DHT Routing which would drop dead connections and add new connections automatically to the DHT Routing table.

Embodiments may provide a mechanism whereby a server client model is established and the DHT Data lives in a collection of centralized databases, be they relational databases or non-relational databases.

DETAILED DESCRIPTION

Figure 1:
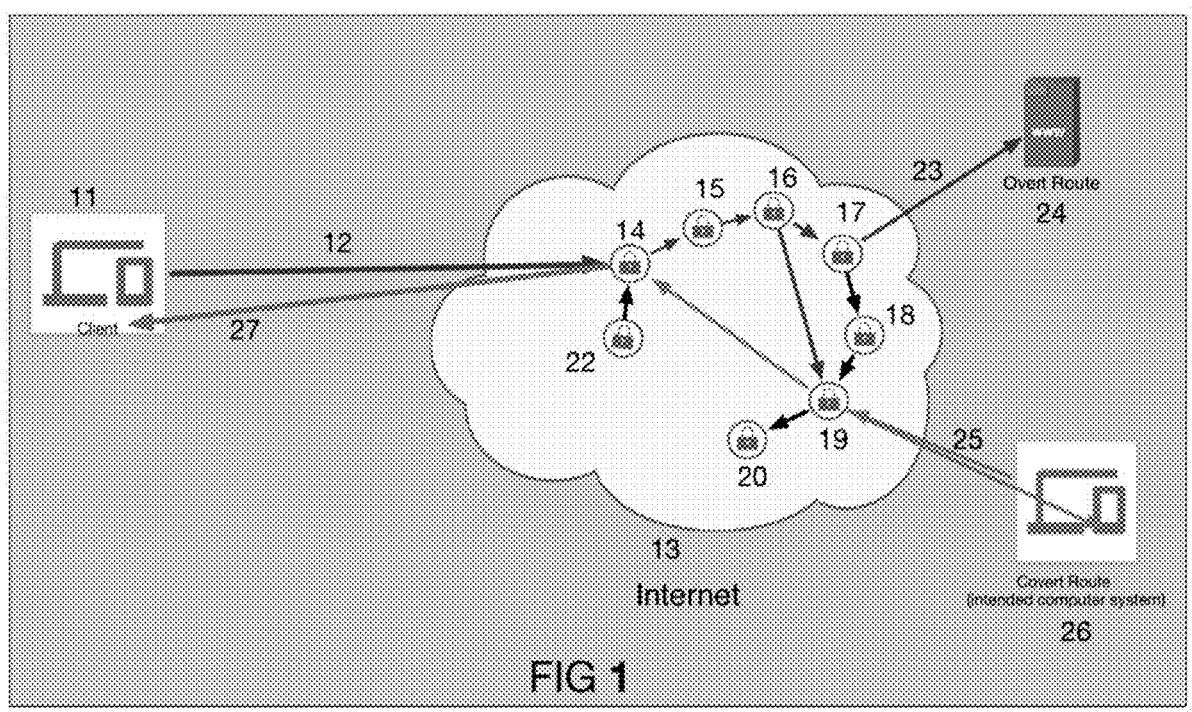
FIG. 1 shows an embodiment in which a client (Mobile Phone or Computer) is using a Decoy Routing scheme via a DHT Routing Table in a simple scenario (all DHT nodes residing inside a single Autonomous System).
Figure 2:
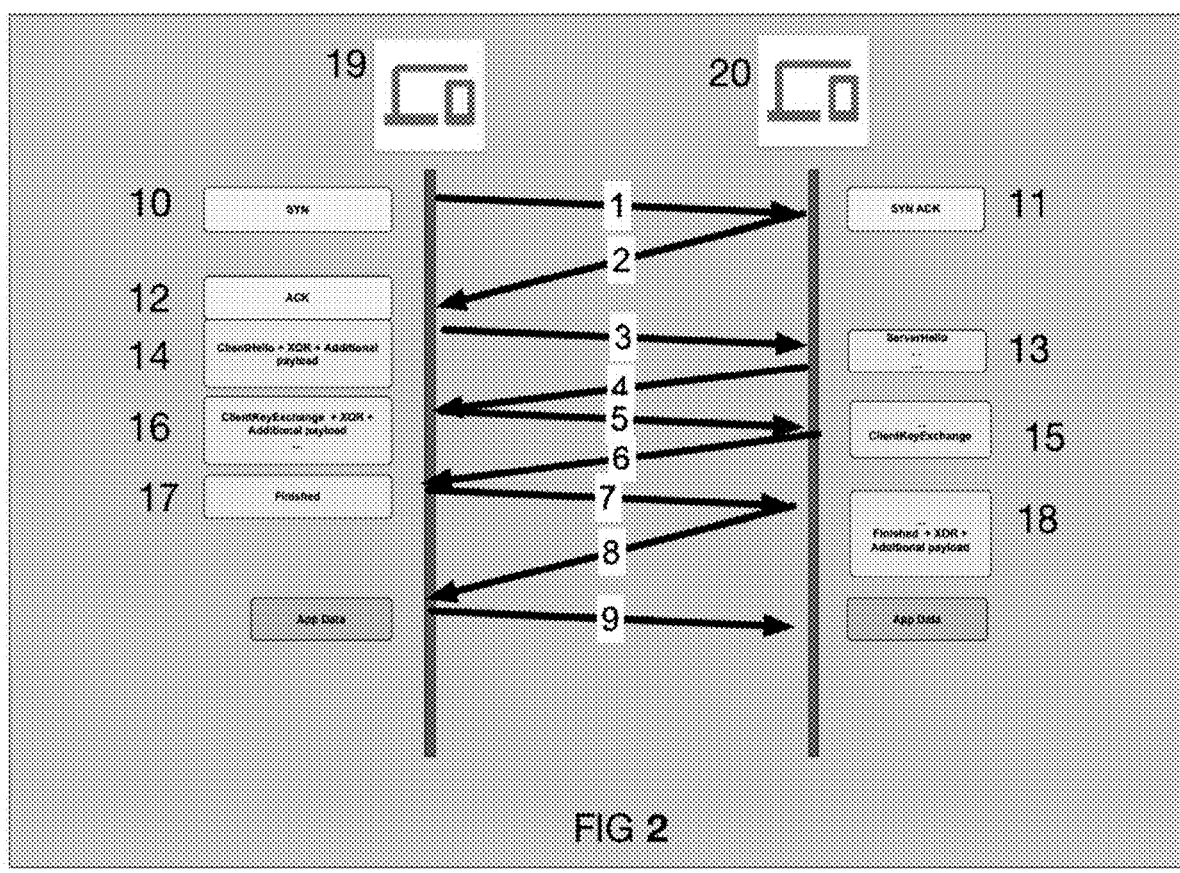
FIG. 2 shows a diagram detailing how a TLS session lifecycle using the architecture described in FIG. 1.
Figure 3:
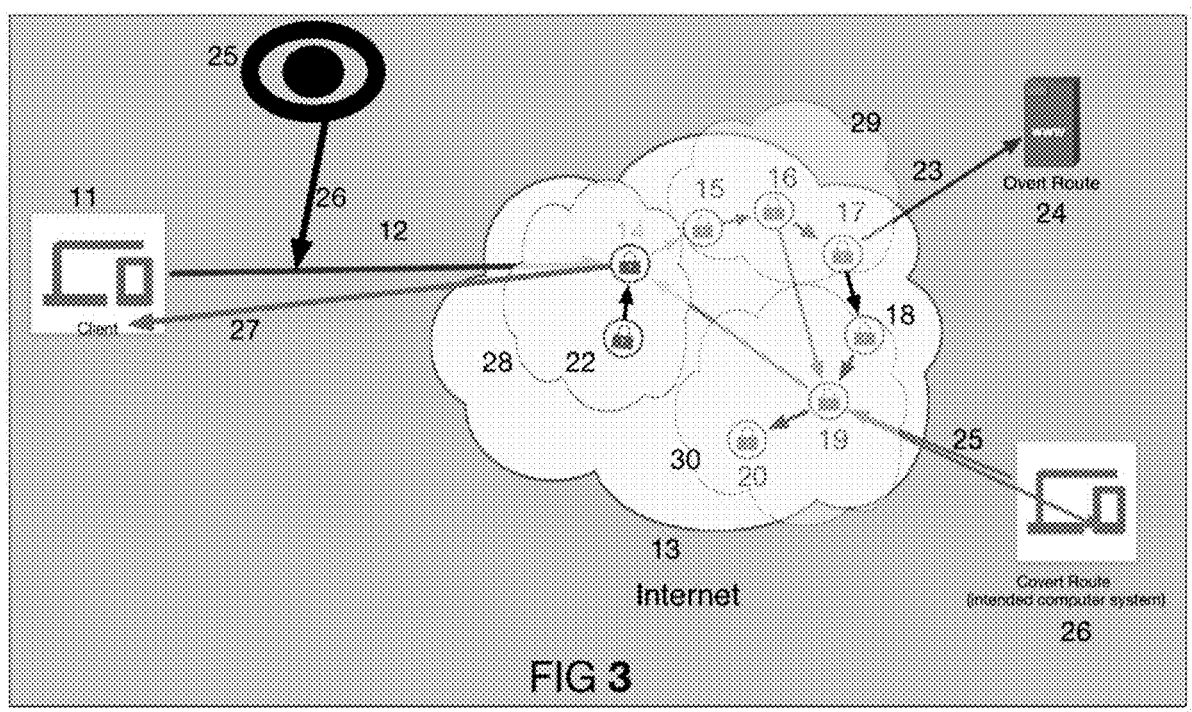
FIG. 3 shows and embodiment in which a client (Mobile Phone or Computer) is using a Decoying routing scheme via a DHT Routing Table which resides inside a collection of separate Autonomous Systems; also a censor is unable to block the traffic.

Embodiments of a decentralized Decoy Routing System that do not depend on conspiring Autonomous Systems to route traffic in a covert manner are represented in FIG. 1 and FIG. 3. FIG. 2 explores the modified TLS handshake needed to successfully execute decoy routing which ensures that the IP Packet being emitted by a computer system is successful in evading censorship, ensures that a computer system intending to send an IP Packet is unable to be replayed in a Transmission Control Protocol (TCP) replay attack, ensures a computer system emitting an IP Packet cannot be used in a latency analysis, ensures a computer system emitting an IP Packet does not convey website fingerprinting, and ensures a computer system emitting an IP Packet can successfully thwart a denial of service (DoS) attack.

FIG. 1 presents a simple embodiment of a Decoy Routing System that does not depend on conspiring Autonomous Systems, and uses a DHT Routing Table to route an IP Packet. In this embodiment, we see 11 a client computer system sending an IP Packet to 14 a DHT Node. This IP Packet's arrow is colored red to indicate that the IP Packet appears to be routing towards the Overt Route 24 by way of 14, 15, 16, 17, 23, and finally to 24. The Overt Route 24 is a destination in the Internet that the client computer system does not care to actually establish a network connection, but would be safe to connect to in the event that a censoring agent were to monitor the network connection. The Covert Route 26 is the route the client computer system is actually intending to establish a network connection with. The Internet is represented by 13. FIG. 1 is an embodiment of the Decoy Routing and DHT Routing Table without respect to the Autonomous Systems that the DHT resides in. FIG. 3 addresses a multi Autonomous Systems embodiment of the resilient Decoy Routing without conspiring Autonomous Systems by instead using a DHT Routing Table method and apparatus. FIG. 1, 22, 14, 15, 16, 17, 18, 19, 20 represent Nodes in a DHT. The routing table is represented by the arrows between these elements.

FIG. 2 is an embodiment of the Decoy Routing System that does not depend on conspiring Autonomous Systems and uses a DHT Routing Table to route an IP Packet in which a censoring agent 25 is present and is inspecting 26 an outgoing IP Packet 12 with Overt and Covert routing information. In the FIG. 3 embodiment, the DHT is configured in a manner in which there are nodes in multiple Autonomous Systems, as seen in 28, 29, 30. FIG. 1 and FIG. 3 both demonstrate an Overt Route 12, 14, 15, 16, 17, 23, 24 as well as a Covert Route 12, 14, 15, 16, 19, 25 and the Covert Route Return 26, 25, 19,14, 27. It should be noted there is no return route for the Overt Route as the client does not actually intend to establish an actual network connection with the Overt Route.

FIG. 2 is an embodiment of a modified TLS handshake which encodes the mechanism by which the Decoy Routing operates. The specific modifications detailed in FIG. 2 enable claims 2, 3, 4, 5, 6. FIG. 2 demonstrates the following scenario, a client computer system 19 sends a SYN to 20 a DHT Node. The DHT Node 20 acknowledges 11 the SYN, Client computer ACK 12 the SYN previously sent, Client 19 sends a Modified ClientHello 14 to DHT Node 20. This modified ClientHello contains additional hidden information about how to actually route the packets once the handshake is established. After the DHT Node 20 sends a ServerHello 13 back to client 19, the Client 19 sends a Modified ClientKeyExchange with additional payload to DHT Node 20. DHT node 20 sends a normal ClientKeyExchange 15 back to Client 19. Client 19 sends a normal Finished to DHT Node 20. DHT Node 20 sends a modified Finished with payload back to Client 19. By sending this modified Finished, the client has acknowledgement that the Decoy Routing is activated. Normal data transfer can now begin. If a censor attempts to inspect this handshake, the censor will see a payload that is encrypted and XORed with the normal ClientHello and appended to ClientHello. It will appear to be random corruption or excess padding in the IP Packet.

The processes described herein, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include, but are not limited to, a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

While there have been described systems, methods, and computer-readable media for resilient decoy routing without conspiring autonomous systems (AS) via distributed hash table (DHT) routing, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims or other language of this disclosure. Therefore, obvious substitutions now or later known to one with ordinary skill in the art are defined to be within the scope of the defined elements.

Therefore, those skilled in the art will appreciate that the concepts of this disclosure can be practiced by other than the described embodiments, which are presented for purposes of illustration rather than of limitation.

What is claimed is:

1. A distributed hash table (DHT) decoy routing method for a first computer system to connect to a second computer system, the method obscuring an actual intended routing path from a third-party observer, the method comprising:
    receiving by a first node participating in the DHT an IP packet from the first computer system;
        wherein the DHT comprises a dynamic plurality of nodes participating in the DHT, the dynamic plurality of nodes forming an overlay network; a keyspace partitioned across the dynamic plurality of nodes, the keyspace comprising a routing table; and a keyspace partitioning scheme that comprises a routing scheme;
    identifying by the first node both an overt destination of the IP packet and an additional payload including encoded information regarding a covert route to the second computer system;
    determining by the first node from the routing table in the partitioned keyspace a second node of the dynamic plurality of nodes participating in the DHT;
        wherein the DHT is configured to automatically modify the dynamic plurality of nodes by adding new nodes and dropping dead nodes, such that the determining the second node does not depend on a known server or a node in a predefined list of nodes being within the dynamic plurality of nodes; and wherein the determining the second node selects as the second node a node of the dynamic plurality of nodes participating in the DHT that is: relative to the first node, toward the second computer system; and not in direct communication with the second computing system; and sending the IP packet by the first node to the second node along the covert route to the second computer system according to the encoded information of the additional payload of the IP packet.

2. The method of claim 1, wherein the first computer system connects covertly to the second computer system in a network where a censoring agent monitors network connections or inspects network packets and would block a connection or censor a packet sent overtly from the first computer system to the second computer system.

3. The method of claim 1, wherein the first node of the DHT is configured so that after the first computer system has connected to the second computer system, a Transmission Control Protocol (TCP) replay attack replaying the IP Packet from the first computer system to the first node will fail.

4. The method of claim 1, wherein the nodes of the DHT are configured so that receiving and transmitting the IP Packet from the first computer system does not provide information that could be used in a latency analysis.

5. The method of claim 1, wherein the IP Packet from the first computer system does not convey a website fingerprint of the first computer system or the second computer system.

6. The method of claim 1, wherein the automatic modifying of the dynamic plurality of nodes of the DHT is configured to successfully thwart a denial of service (DoS) attack.

7. The method of claim 1, wherein the first node determines the second node based on the second node also being toward the overt destination, and sending the IP packet to the second node sends the IP packet along a route toward both the overt destination and the second computer system.

8. The method of claim 1, wherein the additional payload including encoded information regarding a covert route to the second computer system further includes encoded information regarding a return route for communication from the second computer system to the first computer system, and wherein a third node participating in the DHT routes a second IP packet from the second computer system toward the first computer system according to the encoded information regarding the return route.

9. The method of claim 1, wherein identifying the additional payload comprises the first computer system and the first node sending and receiving modified components of a Transport Layer Security (TLS) handshake.

10. The method of claim 9, wherein the TLS handshake is modified by the first computer system sending to the first node a ClientHello that contains information about how to route the IP packet toward the second computer system once the TLS handshake is established, the first computer system sending to the first node a ClientKeyExchange with additional payload, and the first node sending to the first computer system a Finished with a payload acknowledging that decoy routing is activated.

11. The method of claim 10, wherein the information contained in the modified ClientHello is encrypted and XORed with the normal ClientHello and appended to the ClientHello.

12. The method of claim 1, wherein the additional payload appears to be random corruption or excess padding in the IP packet.

13. The method of claim 1, wherein no node of the dynamic plurality of nodes of the DHT is a Border Gateway Protocol (BGP) router of a conspiring or friendly Autonomous System (AS); and wherein all nodes in a route reside inside a single adversarial AS or inside a plurality of adversarial ASes, such that the decoy routing does not depend on a conspiring AS to route traffic to the second computer system.

14. A distributed hash table (DHT) decoy routing system for a first computer system to connect to a second computer system, the DHT decoy routing system obscuring an actual intended routing path from a third-party observer, the DHT decoy routing system comprising:

a dynamic plurality of nodes participating in the DHT forming an overlay network;
wherein the DHT is configured to automatically modify the dynamic plurality of nodes by adding new nodes and dropping dead nodes;
a keyspace partitioned across the dynamic plurality of nodes, the keyspace comprising a routing table;
a keyspace partitioning scheme that comprises a routing scheme;
wherein each node participating in the DHT is a computer system configured to execute instructions stored on a non-transitory computer-readable medium to, as a first node:
receive an IP packet from the first computer system;
identify both an overt destination of the IP packet and an additional payload including encoded information regarding a covert route to the second computer system;
determine from the routing table in the partitioned keyspace a second node of the dynamic plurality of nodes participating in the DHT;
wherein the determining the second node does not depend on a known server or a node in a predefined list of nodes being within the dynamic plurality of nodes; and
wherein the determining the second node selects as the second node a node of the dynamic plurality of nodes participating in the DHT that is, relative to the first node, toward the second computer system; and that is not in direct communication with the second computing system; and
send the IP packet to the second node along the covert route to the second computer system according to the encoded information of the additional payload of the IP packet.

15. The system of claim 14, wherein the DHT decoy routing system does not depend on a conspiring or friendly Autonomous System to route traffic in a covert manner.

* * * * *